Figure 1:
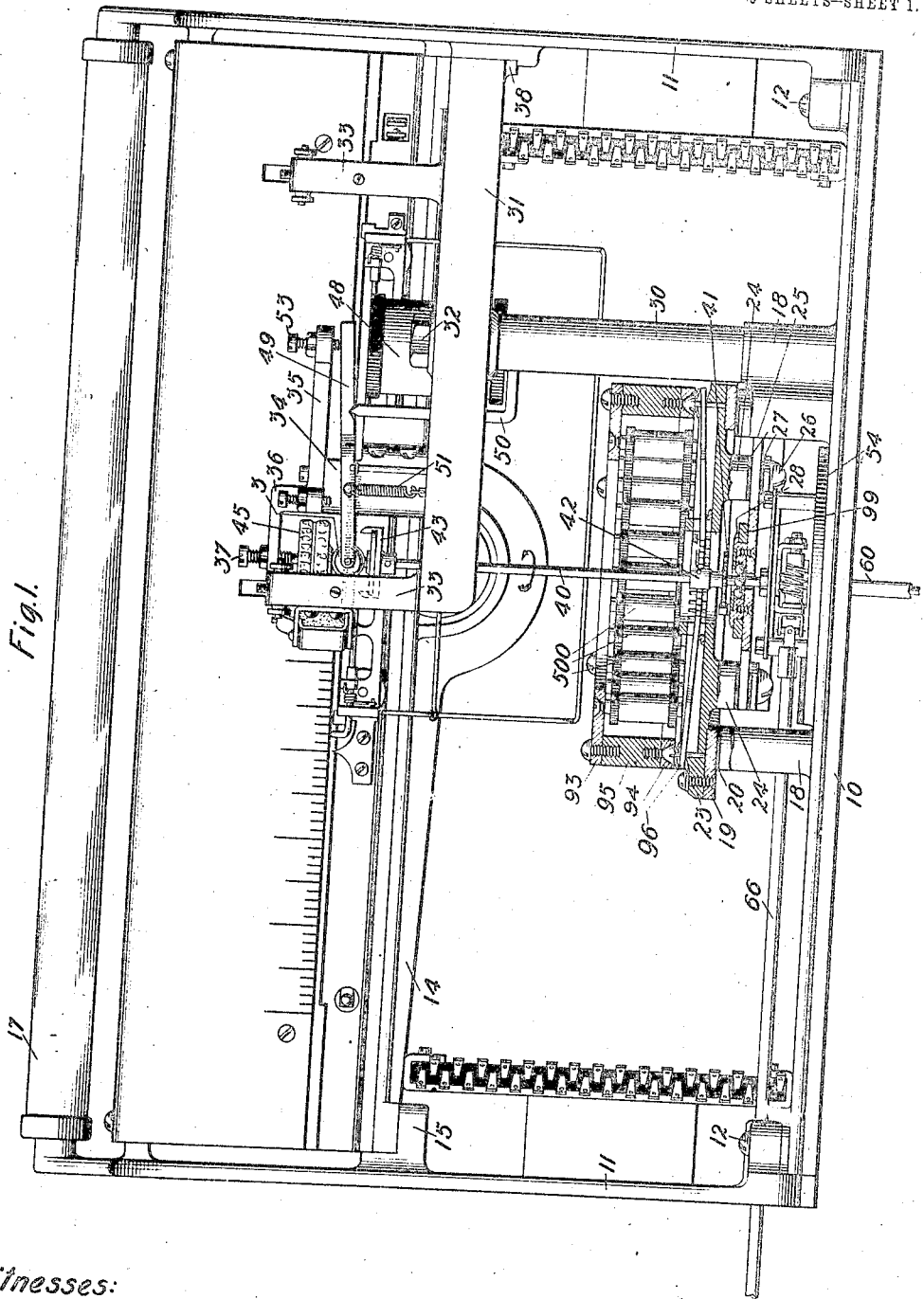

F. R. McBERTY.
PRINTING TELEGRAPH.
APPLICATION FILED MAY 31, 1912.

1,107,336.

Patented Aug. 18, 1914.
9 SHEETS—SHEET 1.

Witnesses:
W. F. Hoffman
Frank Toohey

Inventor:
Frank R. McBerty.
by John C. Roberts,
Atty.

F. R. McBERTY.
PRINTING TELEGRAPH.
APPLICATION FILED MAY 31, 1912.

1,107,336.

Patented Aug. 18, 1914
9 SHEETS—SHEET 3.

Witnesses:
W. F. Hoffman
Frank Tooley

Inventor:
Frank R. McBerty.
by John C. Roberts
Att'y.

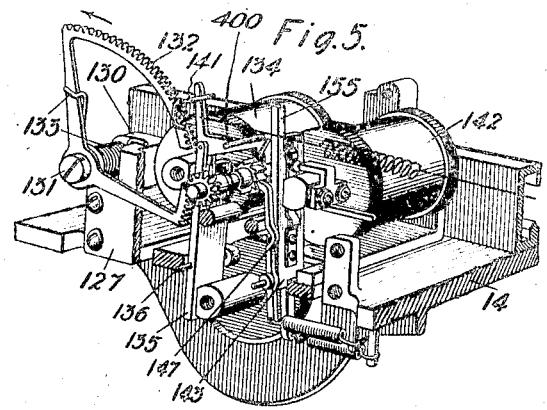
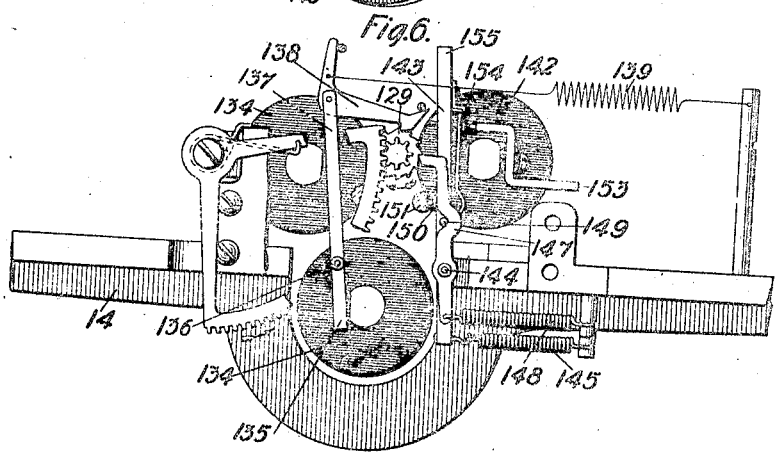
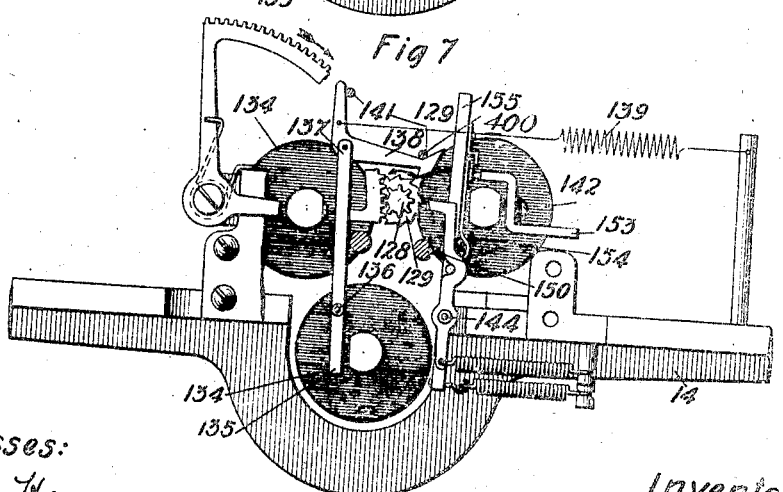

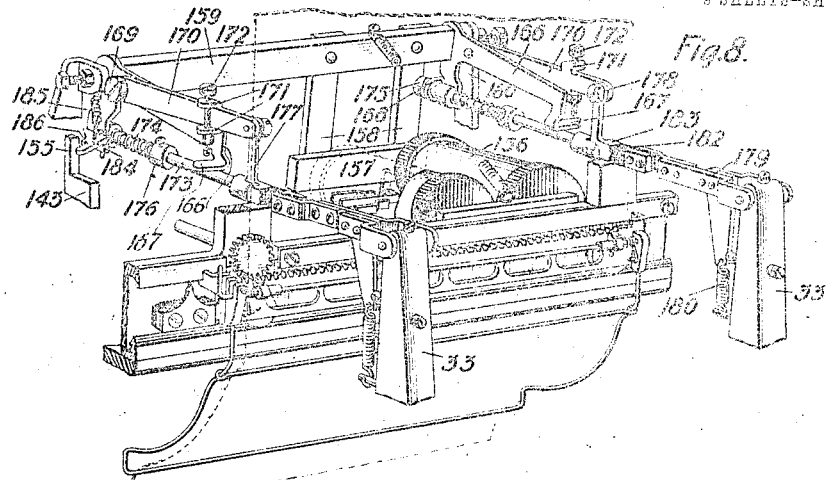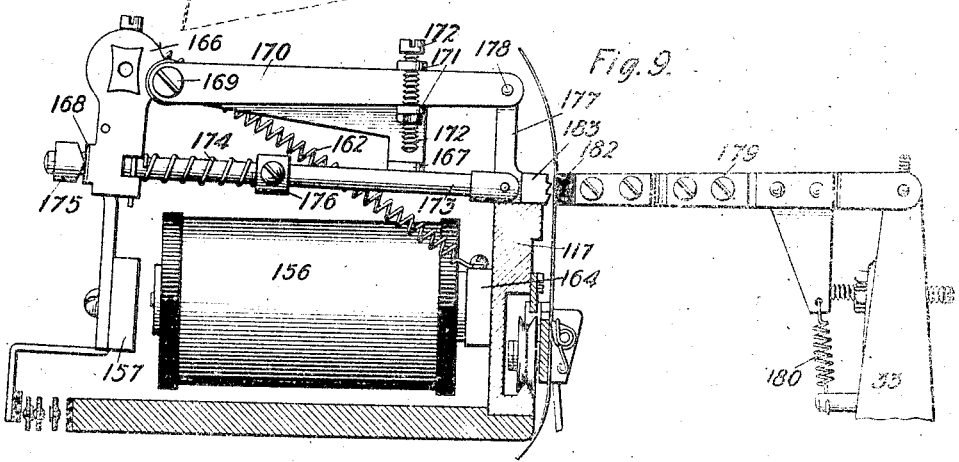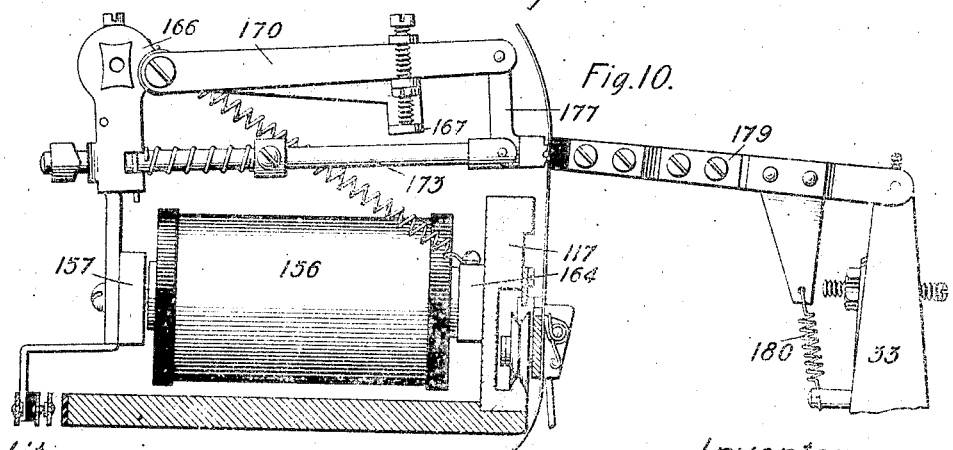

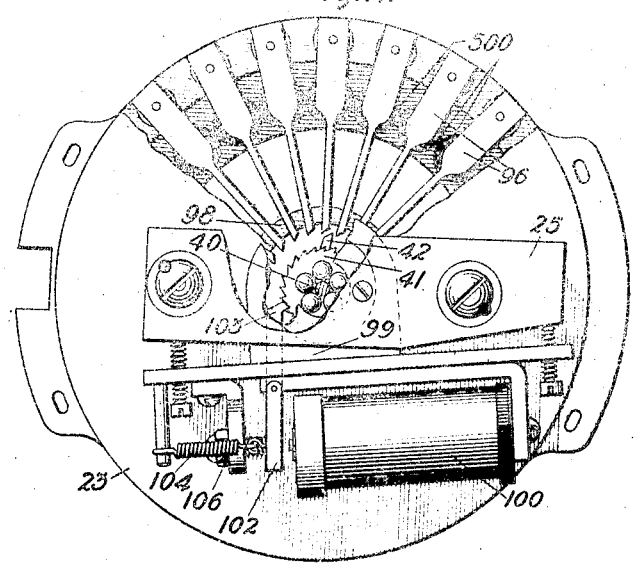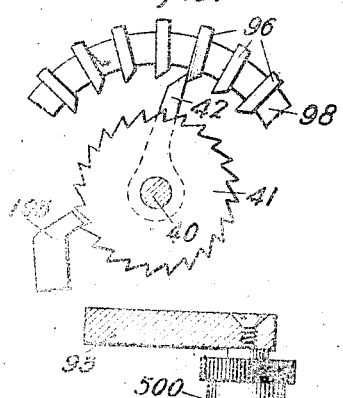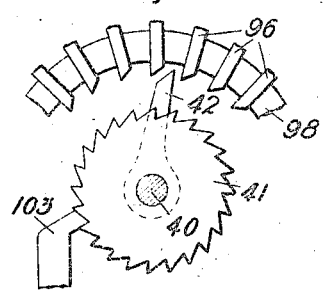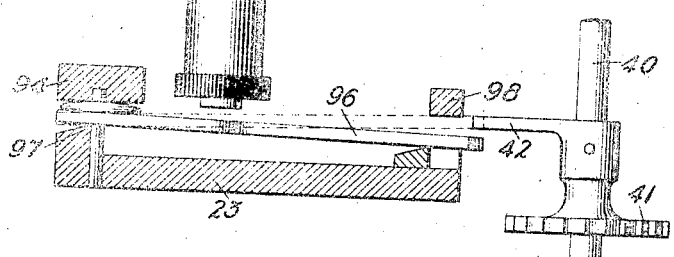

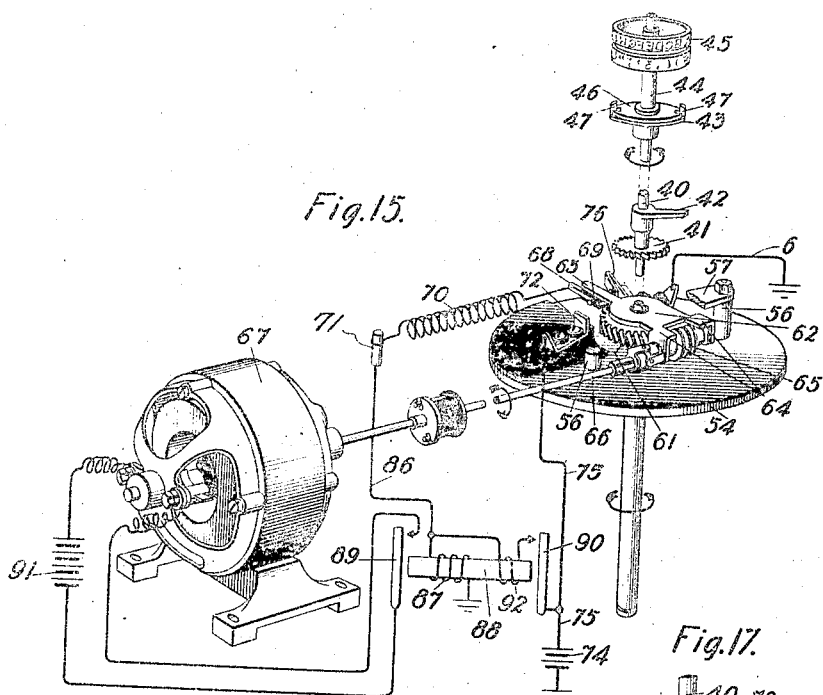

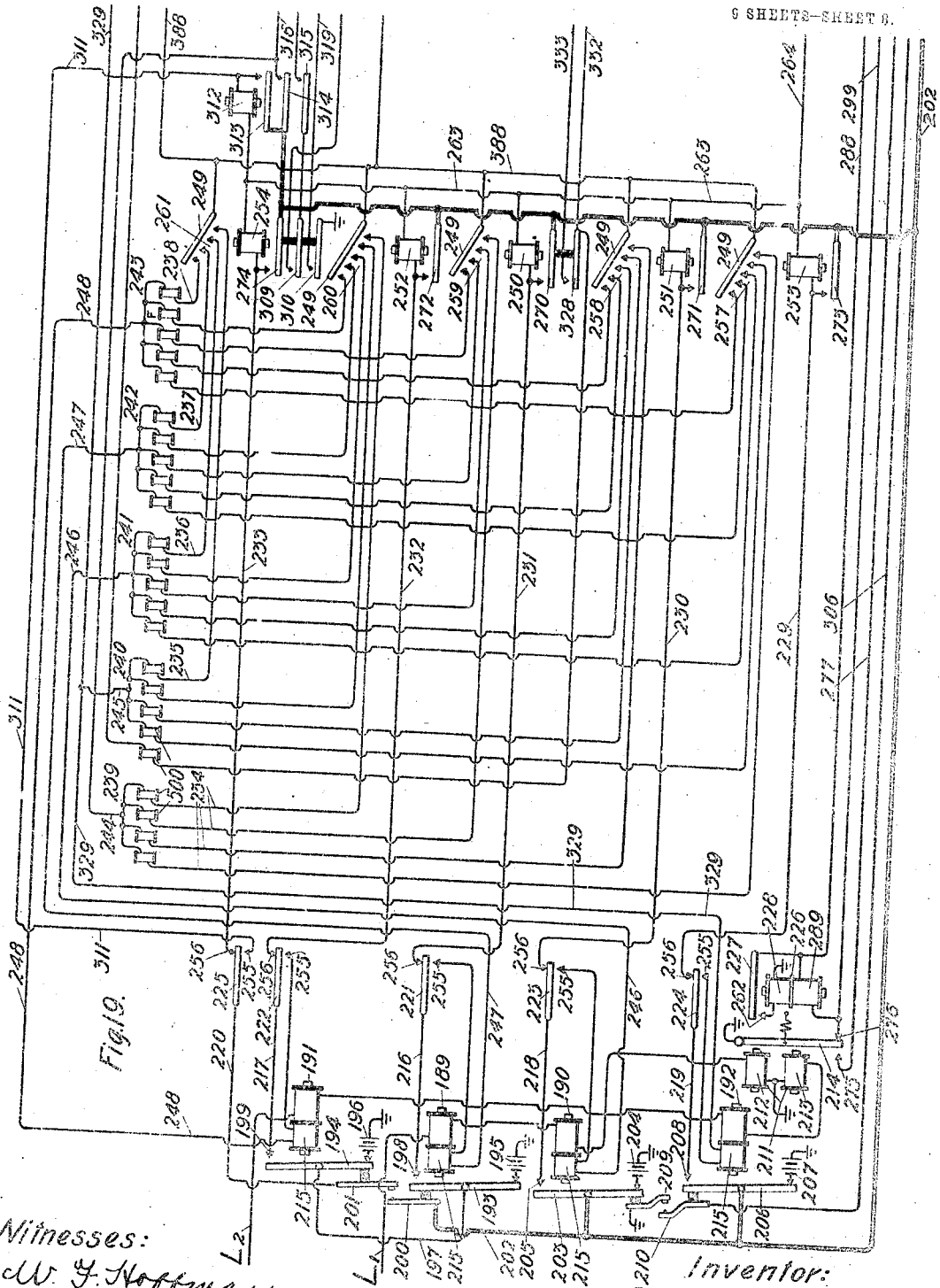

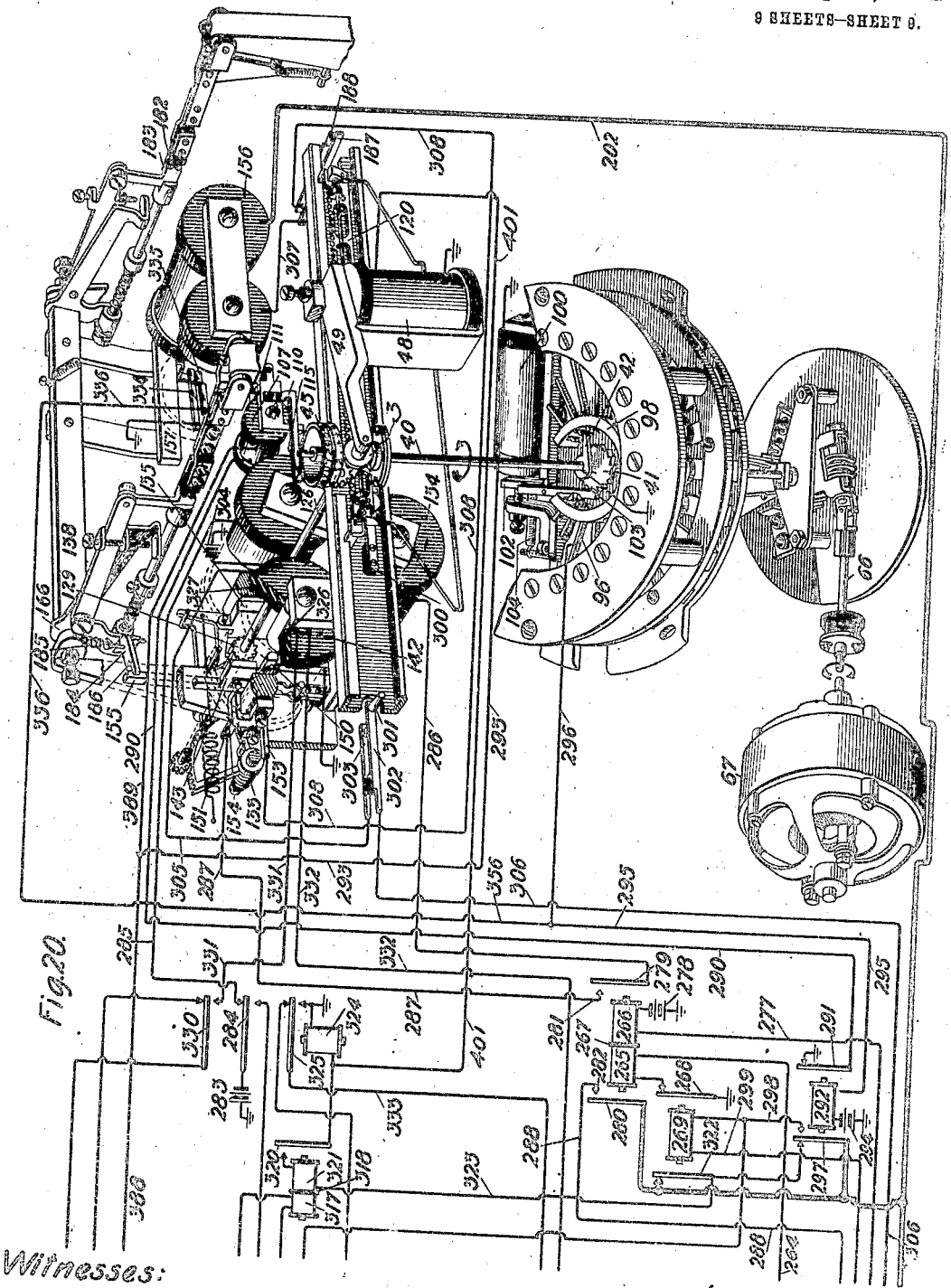

UNITED STATES PATENT OFFICE.

FRANK R. McBERTY, OF NEW ROCHELLE, NEW YORK, ASSIGNOR TO WESTERN ELECTRIC COMPANY, OF NEW YORK, N. Y., A CORPORATION OF ILLINOIS.

PRINTING-TELEGRAPH.

1,107,336.

Specification of Letters Patent.     Patented Aug. 18, 1914.

Application filed May 31, 1912. Serial No. 700,767.

*To all whom it may concern:*

Be it known that I, FRANK R. MCBERTY, citizen of the United States, residing at New Rochelle, county of Westchester, and State of New York, have invented a certain new and useful Improvement in Printing-Telegraphs, of which the following is a full, clear, concise, and exact description.

This invention relates to printing telegraphs and has for its object an improved system and apparatus whereby increased speed, accuracy and efficiency may be obtained in the production of a printed record in an improved and standard manner.

One of the objects of this invention is to provide a system in which a printed record is produced by mechanism under control of electromagnetic switching devices arranged in an improved manner and in turn controlled by impulses received over what is known as a two-wire metallic circuit with ground return, there being necessary for the entire control of the improved system but the two wires and the ground return referred to.

A further object of this invention is to provide an improved and novel arrangement of apparatus and mechanism whereby the production of a printed record accurately and efficiently is assured and expedited, such mechanism and apparatus, owing to its improved construction being guarded against derangement and under the control of electromagnetic apparatus controlled from a distant station.

One of the features, therefore, of this invention involves the provision in electromagnetic controlling apparatus of a neutral or common relay associated with both of the control circuits over which the control of the entire mechanism is exercised, such relay being so arranged with relation to the incoming controlling and local selecting circuits as to greatly simplify the controlling operations of the system.

Another feature of the invention involves an improved and simplified arrangement of circuits and apparatus whereby when certain circuit conditions exist in the incoming or controlling circuits, all relays or other electromagnetic switches associated with the local selecting and controlling circuit will be immediately and automatically restored to their normal condition.

Another feature of the invention relates to improved and novel circuit arrangements whereby the control of the shifting operation of the type wheel in the printer mechanism proper is simplified.

A further feature of the invention involves improved and novel circuits and apparatus for moving the record paper upon which the record is made at such times as may be necessary in a manner which is positive and simple and which will operate at all times without danger of damaging the paper or deranging the printer mechanism itself.

A further feature of the invention relates to circuits and apparatus whereby the carriage carrying the paper upon which the printed record is made may be reset to its normal or initial position either automatically or under the control of the operator in an expeditious and positive manner without danger of derangement during such resetting movement from any external or internal causes.

A further feature of the invention involves an improved and novel arrangement of circuits and apparatus whereby the intermittently revolving type shaft may be supplied with power in an improved and efficient manner by apparatus which is automatic and positive in its action.

Figure 2:
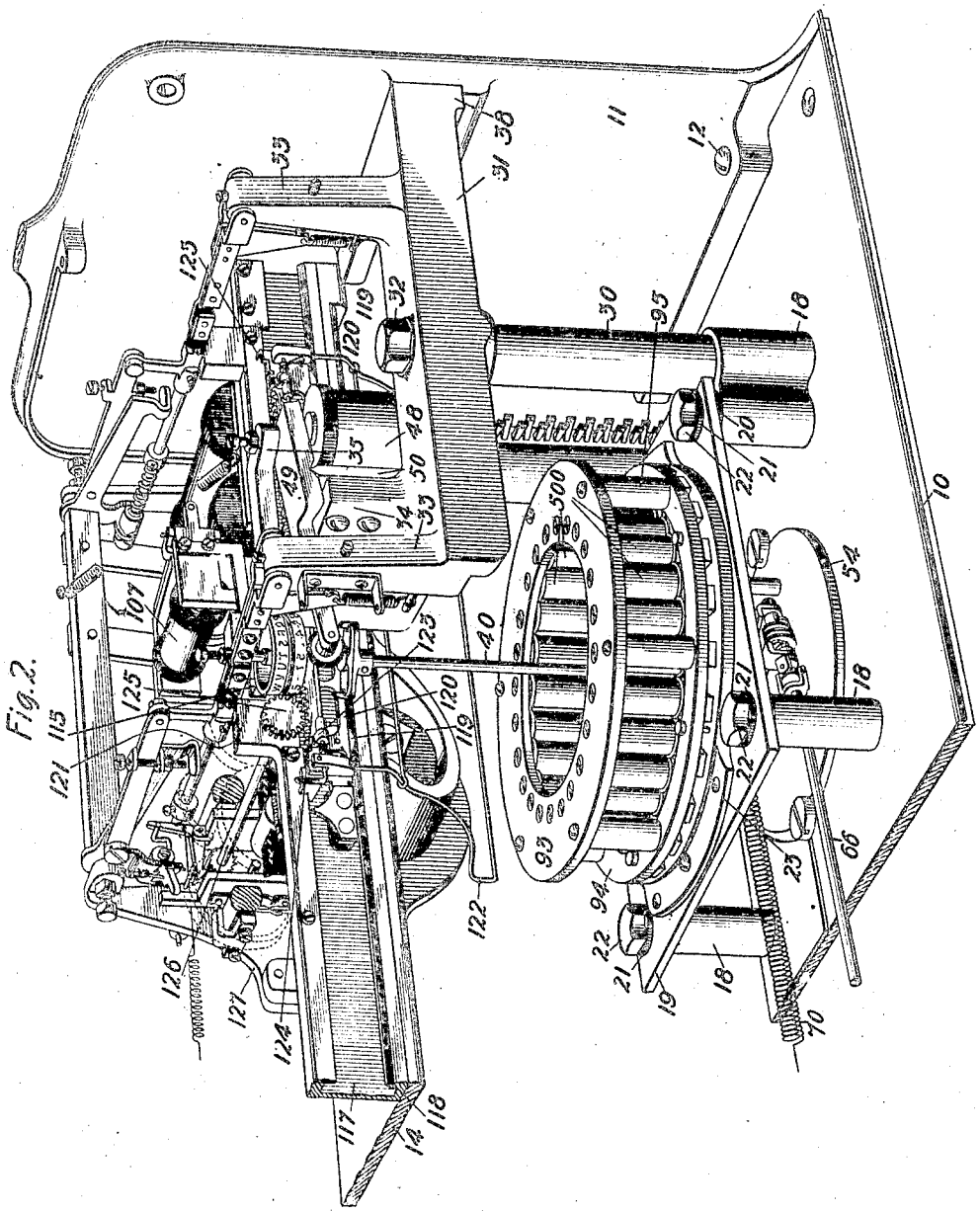
Figure 3:
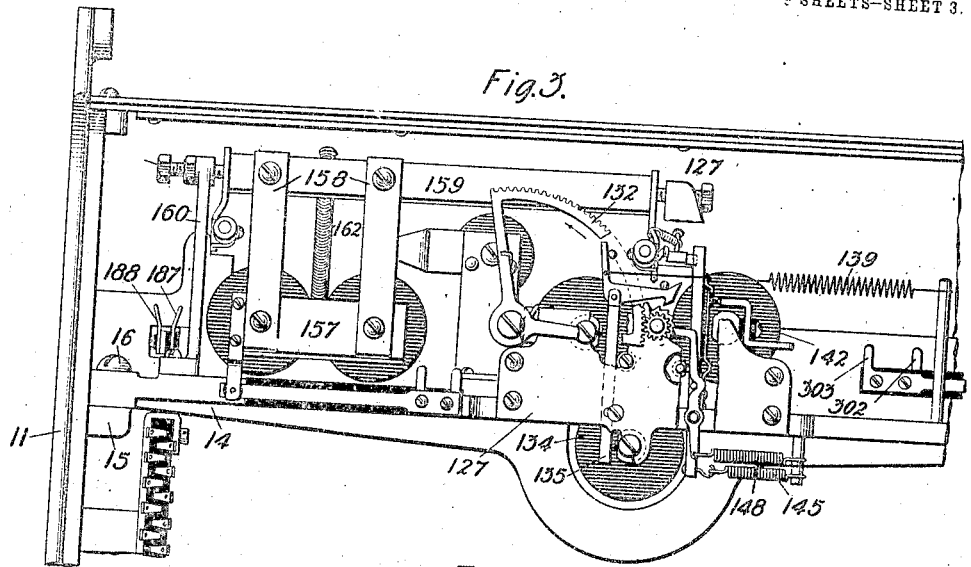
Figure 4:
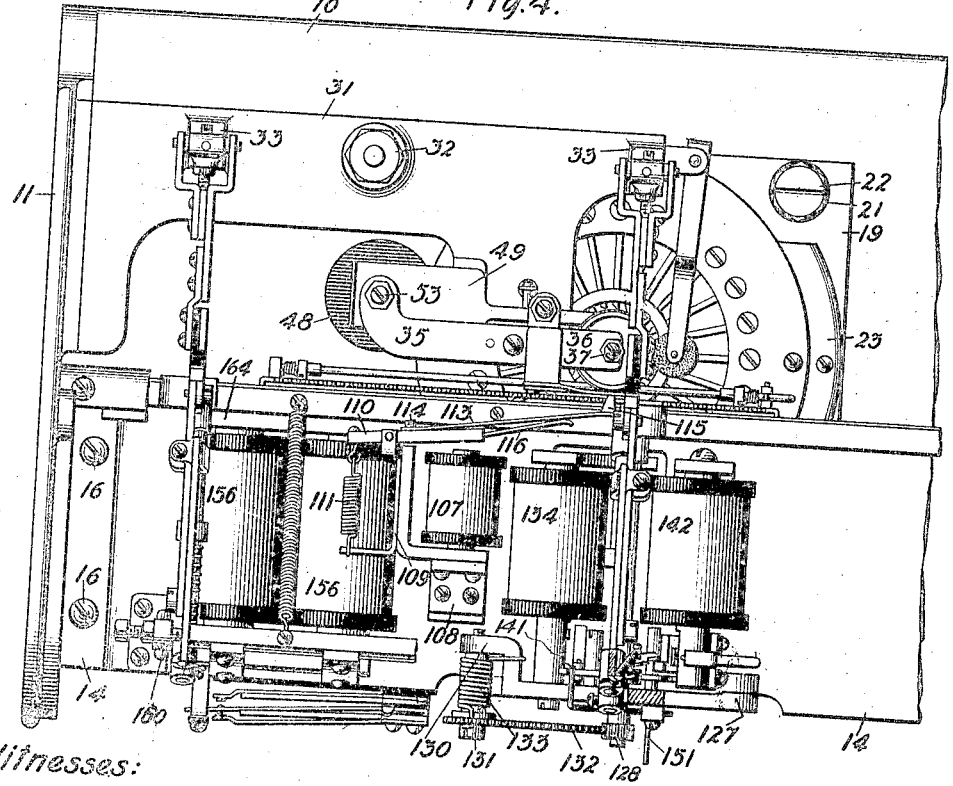

In the drawings—Figure 1 is the front elevation of a printing telegraph receiver embodying my invention; Fig. 2 is a perspective view of a portion of the machine with the inking roller removed showing the relation of the various elements one to another; Fig. 3 is a rear elevation of a portion of the device showing the location of the reset and spacing magnets; Fig. 4 is a top plan view of a portion of the device showing the relative position of the paper lift magnets, the spacing and reset magnets and the printing magnets; Fig. 5 is a perspective view showing the details of spacing and reset magnets, and the mechanism controlled thereby; Fig. 6 is a rear elevation of the structure shown in Fig. 5 with the gear segment in final position; Fig. 7 is a view similar to Fig. 6 but with the reset magnet shown energized and the gear segment returned to its initial position; Fig. 8 is a detail perspective view of the paper lift mechanism; Fig. 9 is a side elevation, with parts shown in section of the paper lift mechanism in its initial position; Fig. 10 is a view similar to Fig. 9 but with the paper lift magnets energized and the paper lifted; Fig. 11 is a top plan view of the type magnet crown with the top plates shown broken away showing the relative position of the type magnet armatures and the revolving arms on the type shaft; Fig. 12 is a sectional view of the type magnet crown showing the normal position of the type magnet armature with respect to the revolving arm on the type shaft; Figs. 13 and 14 are detail views showing the type magnet armatures, the arm on the revolving type shafts and the armature of the stop magnets in two different positions; Fig. 15 is a detail perspective view of the intermittent drive mechanism for the type shaft; Fig. 16 is a plan view of intermittent drive mechanism; Fig. 17 is a sectional elevation of intermittent drive mechanism taken on line 17—17 to Fig. 16; Fig. 18 is a detail perspective view showing the flexible connection between the type shaft proper and the spring motor driven part thereof; Figs. 19 and 20 combined constitute a diagram illustrating the various circuits employed in this invention with so much of the elements in perspective as is necessary to illustrate the working thereof.

The frame of the machine is composed of a base plate 10 with two side plates 11 fastened thereto by screws 12. Extending between side plates 11 and parallel to base plate 10 is a plate 14, resting on lugs 15 integral with side plates 11, and fastened thereto by means of the screws 16. Mounted at the top of the side plates is a roller 17 which acts as a guide for the paper and as a brace for the upper parts of the sides 11.

Extending from the base plate 10 are uprights 18 upon which is mounted a plate 19. This plate 19 is fastened to the uprights 18 by means of the screws 22 and insulated therefrom by insulating washers 20 and 21. Mounted on the plate 19 is a plate 23 having two downwardly extending lugs or bosses 24. Mounted on these lugs 24 is a plate 25 fastened to the lugs by means of the screws 26 and insulated therefrom by insulating washers 27. Mounted on plate 25 is a bearing 28. Mounted on one of the bosses 18 is an upright 30 to the upper end of which is fastened a plate 31 attached, at its end 38, to the side plate 11 by means of screws (not shown). This plate 31 carries two uprights 33 for a purpose to be hereinafter described. There is also an upright 34 integral with the plate 31 on which is mounted a plate 36 fastened to the upright 34. At the outer extension of the plate 36 is mounted an adjustable pivot bearing 37. Mounted in the pivot bearing 37 and in the bearing 28 is a type shaft 40 to which is fastened a ratchet 41, a radial arm 42 and a driving clutch 43. Slidably mounted on the upper part of the type shaft 40 is a tube 44 having at its upper end a type wheel 45 provided with two rows of characters and at its lower end a clutch member 46 meshing with arms 47 of the clutch member 43 on the shaft 40. Mounted on the upright 34 is a shift magnet 48 having its armature 49 pivoted on an extension 50 of the core. This armature is held in its normal position by a spring 51. The upward movement of the armature 49 is limited by an adjustable stop 53 on the extension 35 of the plate 36. The outer extension of the armature 49 carries a roller 3 located between the lower surface of the type wheel 45 and the upper surface of the clutch member 46. The normal position of the type wheel is shown in Fig. 1 with the shift magnet deënergized. When in normal position printing will be done from the upper row of type shown on the type wheel. When the shift magnet is energized it attracts its armature 49 and the roller 3, contacting with the type wheel 45, moves the type wheel longitudinally of the shaft 40 bringing the lower row of type on the type wheel into printing position.

Mounted on the base plate 10 is a plate 54, on which is mounted two pedestals 56 carrying the plate 57. This plate 57 is perforated as at 59 providing a bearing surface for the tube 60. Fastened to the tube 60 and rotating therewith is a worm wheel 61 which supports on its upper surface a plate 62 carrying at one end an extending arm 63 and at its other end bearing members 64. Mounted in the bearing members 64 and meshing with the worm gear 61 is a worm 65 driven by a shaft 66 which in turn is driven by the motor 67. Fastened to the arm 63 is the conducting member 68 insulated from the arm 63. A spring 70 tends to keep the arm 68 in contact with the terminal 72, fastened to but insulated from the plate 54. This terminal 72 is connected to the battery 74 by the conductor 75. The shaft 66 rotates in the direction of the arrow shown in Fig. 15 and tends to move the contact arm 68 into contact with a terminal 76, fastened to but insulated from plate 54.

The end of the shaft 40 is fastened to the part 78 which is slotted as at 79 and 80. Mounted in the tube 60 is a shaft 81 journaled at 82 therein and having its upper end 83 meshing with the slot 80 in the lower portion of the part 78. Surrounding the shaft 81 is a spring 84 fastened at its upper end in the slot 79 and at its lower end to the lower part of the tube 60 by means of the screw 85. This spring drives the shaft 40 in a counter-clockwise direction when viewed from above as indicated by the arrow in Fig. 15. The terminal 76 is connected to ground through the conductor 6. When the shaft 40 revolves in the direction of the arrow as shown, the tension of the spring 84 is reduced allowing the spring 70 to draw the contact 68 into engagement with the terminal 72 thereby establishing a circuit from battery 74, conductor 75, terminal 72, contact 68, the spring 70, pedestal 71, conductor 86, energizing winding 87 of the electromagnet 88 to ground. The magnet 88 becomes energized attracting both its armatures 89 and 90. The attraction of the armature 89 closes the circuit for the motor 67 which obtains current from the source 91. The motor 67 rotates the shaft 66 which, through the medium of the worm and worm wheel winds up the spring 84 overcoming the tension in the spring 70 and moving the contact 68 away from the terminal 72. The separation of 68 and 72, however, will not break the operating circuit for the motor 67 as a locking circuit for the electromagnet 88 is established from the battery 74, conductor 75, armature 90, resistance 92, energizing winding 87 to ground. When the spring 84 has been sufficiently wound up the tension in the spring 70 is overcome and the contact 68 moves into engagement with the terminal 76 thereby establishing a shunt circuit for the energizing winding 87 of the electromagnet 88, which circuit may be traced from battery 74, conductor 75, armature 90, resistance 92, conductor 86, pedestal 71, spring 70, contact 68, terminal 76, conductor 6 to ground. Closure of this shunt circuit removes battery from energizing winding 87 allowing both the armatures 89 and 90 to retract, thus breaking the operating circuit for the motor 67 at the armature 89. This operation is entirely automatic and is repeated whenever the tension in the spring 84 becomes less than the tension in the spring 70.

Mounted on the plate 23 is a type magnet crown composed of upper and lower plates 93, 94, respectively, and spaced apart by spacing pieces 95. Circumferentially mounted on the upper plate 93 is a series of type magnets 500. Armatures 96 of these type magnets have their bearing between the lower plate 94 and the knife edge portion 97 of the plate 23. These armatures extend radially with the type shaft 40 as a center and the inner ends thereof are mounted in the slotted ring 98. The normal position of these armatures is shown by the full lines in Fig. 12 and it may be seen that their relation with respect to type shaft 40 and radial arm 42 is such that in the normal or deënergized condition of the type magnets the type shaft 40 is free to revolve. When, however, any one of the type magnets is energized its armature 96 is attracted into the dotted position shown in Fig. 12 and into the path of movement of the radial arm 42. The shaft 40 is thus brought to rest and in such position that the character on the type wheel 45, corresponding with the type magnet energized, is brought into printing position.

Pivotally mounted on the plate 25 is a bracket 99 on which is mounted the stop magnet 100. This magnet is adjustable with respect to the plate 25. The armature 102 of this stop magnet 100 has an extension 103 forming a pawl which in the deënergized condition of the stop magnet meshes with the ratchet 41 mounted on the type shaft 40. A spring 104 holds the armature against the adjustable back stop 106. When the stop magnet 100 is energized the pawl 103 is removed from engagement with the ratchet 41 allowing the shaft 40 to revolve through the medium of the spring 84 until brought to rest by the arm 42 contacting with an armature 96 of a selected type magnet.

At the rear of the type wheel 45 is a printing magnet 107, carried on the bracket 108. On the extension 109 of the core of this magnet 107 is mounted an armature 110 carrying at its inner end a retracting spring 111. On the outer face of the armature 110 is the spring member 113 fastened to the armature by a screw 114 and the outer end of this spring member 113 carries a presspad 115. Bearing against this spring member 113 is a spring member 116 fastened to the outer end of the armature 110 and acting as cushion for the presspad 115. The paper, on which the record is made by the character on the type wheel, passes between the type wheel 45 and the presspad 115. Mounted on the plate 14 and fastened thereto in any appropriate manner is a carriage guide 117. This carriage guide extends between the side plates 11 and has a track 118 for the guiding rolls 119 of the paper carriage 120. The upper part of this guide is perforated as at 121 through which perforation the presspad 115 projects. The paper carriage 120 is provided with a rack 124 in mesh with a pinion 125 mounted on the shaft 126. This shaft 126 is journaled in the carriage guide 117 and in a plate 127 fastened on the rearward portion of plate 14. The rear end of this shaft carries a pinion 128. On an extension 130 of the plate 127 is a shaft 131 on which is mounted a segmental gear 132 which meshes with the pinion 128. The gear 132 and pinion 128 tend to revolve in the direction of the arrows, in Figs. 5 and 6, under the influence of the spring 133. Mounted on the plate 127 is a spacing magnet 134 having two windings, and its armature 135 is pivoted at 136. At the extremity 137 of the armature 135 is mounted a pawl 138 in the form of a bell crank. The pawl 138 tends to move downward into mesh with ratchet 129 mounted on shaft 126 because of the tension of a spring 139 but is normally prevented from so doing by a stop 141 secured to the frame 127. When, however, the spacing magnet 134 is energized to attract its armature 135, pawl 138 moves into contact with the ratchet 129 and is advanced, thereby revolving the shaft 126 through a part of a revolution and moving the segmental gear 132 in the direction of the arrow shown in Fig. 7 or the reverse of the direction of the arrow shown in Fig. 5. The pawl 138 may be prevented from advancing the ratchet 129 too far by a stop 400 secured to the frame 127. This movement of the segmental gear 132 increases the tension in the spring 133 insuring the return of the segmental gear 132 to normal position after the release of a ratchet stop 147 from the ratchet 129 as hereinafter explained. The successive energization and deënergization of the spacing magnet 134 causes a step-by-step movement of the paper carriage 120 from its normal position to the right in Fig. 2 to the limit of its travel.

Mounted on the plate 14 and parallel with the spacing magnet 134 is a reset magnet 142. This reset magnet is provided with two windings 326 and 327, either of which is sufficient to energize the magnet and attract the armature 143 pivoted at 144 on the plate 127, and which is held in its normal or retracted position by the spring 145. Concentrically mounted with the armature 143 is a ratchet stop 147 held normally in contact with the ratchet 129 by means of spring 148. Extending laterally from the armature 143 is a pin 149 which, when the reset magnet is energized, contacts with the ratchet stop 147 removing the same from contact with the ratchet 129, allowing the shaft 126 to revolve under the influence of the spring 133 thus returning the paper carriage 120 to its initial position. On the outer face of the armature 143 is a contact 150 normally in engagement with contact 151 for a purpose to be hereinafter described. Mounted on the core of the magnet 142 but insulated therefrom is a contact 153 which, when the magnet is energized, contacts with spring contact member 154 mounted on the inner face of the armature 143. The upper end of the armature 143 carries an extension 155 for a purpose to be hereinafter described. Mounted on the rear of the carriage guide 117 is the paper lift magnet 156. The armature 157 of this magnet is carried by two depending members 158 which members are in turn carried by a member 159 pivoted one end in the plate 127 and the other end in a pedestal 160 mounted on the plate 14. The armature is held in its normal or retracted position by the spring 162. At each end of the pivoted member 159 is rigidly fastened an angular member 166. The longer arm of this angular member 166 has a downwardly and outwardly extending portion 167 while the shorter arm of member 166 extends downwardly and inwardly as at 168 forming a bearing member for a purpose to be hereinafter described. Pivotally mounted on each of the angular members 166 is a member 170 with an outwardly extended portion, intermediate its ends, which forms a bearing for an adjusting screw 172 which contacts with the downward and outward extended portion 167 of the angular member 166.

Slidably mounted in the arm 168 of the angular member 166 is a shaft 173 held in its outward position by means of a spring 174 and limited in such outward movement by a collar 175 fastened to the end of the shaft 173 and contacting with the part 168. The tension of this spring 174 may be regulated by adjusting the collar 176 on the shaft 173. To the outer end of the shaft 173 is pivoted an angular gripping device 177 which is also pivoted to the outer end of the member 170 as at 178. Mounted on the pedestals 33 and extended from the plate 31 are bell crank levers 179 held in their normal position by springs 180. The horizontal arms of these bell crank levers carry insulation 182 which forms a movable abutment for the gripping surface 183 on gripping member 177. These gripping surfaces 183 extend beyond the part 117 and when the paper lift magnet 156 is energized gripping surface 183 moves forward into contact with the part 182 thereby gripping the paper, and as the armature 157 moves forward from the position shown in Fig. 9 to position shown in Fig. 10 the part 167 moves upward into contact with adjusting screw 172 and the gripping member 183 is moved upwardly thereby carrying the paper upwardly across the face of the paper carriage a sufficient distance to provide a clean surface for the printing of a new line of characters.

When the paper lift magnet 156 is deënergized the spring 162 returns all the parts to their normal position as shown in Fig. 9. Mounted on one of the members 166 is a stop or lock device 184 which is moved rearwardly, as viewed in Fig. 8, by a spring 185. This lock device is normally in the position shown in Fig. 8 with the portion 186 in contact with the extension 155 of the reset magnet armature 143. When the reset magnet 142 is energized, it attracts its armature 143 and the extension 155 thereon is moved out of contact with the portion 186 of the lock device 184. The lock device 184 moves rearwardly under the influence of spring 185 and when the reset magnet 142 is deënergized its armature 143 is locked in attracted position by the lock device 184. The reset magnet 142 being energized, removes the ratchet stop 147 from engagement with the ratchet 129 and the paper carriage 120 will move to its initial position under the influence of the spring 133. The armature 143 of the reset magnet 142 will remain locked in attracted position as above described until the end of the paper carriage 120 forces contact 187 into engagement with contact 188 as shown in Fig. 20, thus completing the energizing circuit for the paper lift magnet 156. The paper lift magnet 156 being energized will move the paper upwardly as above described and will also move the lock device 184 forwardly sufficient to allow the extension 155 of the reset magnet armature 143 to move into contact with the part 186.

The various characters are selected by a combination of but two impulses, which impulses are positive or negative in character and may be received over either one or both of the main line conductors. In Figs. 19 and 20 the line wires are designated by the reference letters $L^1$ and $L^2$. In Fig. 19, 189 and 190 designate relays which are responsive respectively to positive and negative impulses received over line wire $L^1$, and 191 and 192 designate relays which are responsive respectively to positive and negative impulses received over line $L^2$. The relays 189 to 192 inclusive are connected in groups, 189 and 191 constituting one group and 190 and 192 another group. Relays 189 and 191 are provided with armatures 193 and 194 respectively. Armature 193 is normally connected to ground through battery 195; armature 194 is normally connected to ground through battery 196. The two armatures, 193 and 194, are electrically connected by the conductor 197. When relay 189 is energized its armature 193 makes contact with 198 and relay 191 when energized attracts its armature 194 which makes contact with 199. Mounted on the extremity of the armature 193 is a conducting element 200 while mounted on the armature 194 is a conducting element 201. The relays 189 and 191 are so related that when either of the relays is energized its armature makes contact with either of the contacts 198 and 199 respectively, but if the relays are simultaneously energized, contact is made between 200 and 201. Contact element 200 is connected to common battery wire 202.

Relay 190 has an armature 203 which is normally connected to ground through a battery 204. When the relay 190 is energized, the armature 203 makes contact with the contact 205. Relay 192 has an armature 206 which is normally connected to ground through the battery 207 and when the relay 192 is energized, the armature 206 makes contact with the contact 208. The armatures 203 and 206 are connected directly to the common battery wire 202. Armature 203 carries a conducting element 209 while armature 206 carries a conducting element 210. The relation of the armatures and extensions of the relays 190 and 192 is identical with the corresponding members of relays 189 and 191. A neutral relay 211 having two windings 212 and 213, either of which is sufficient to cause the attraction of the armature 214 is provided, winding 212 being in series with relays 189 and 190, and winding 213 being in series with relays 191 and 192. The relays 189 to 192 inclusive are each provided with a locking winding 215 which is sufficient, when energized, to hold the armature of the relays in their attracted position after the circuit through the energizing winding of the same is broken. Leading from the contacts 198, 199, 205 and 208, respectively, are conductors 216, 217, 218, and 219, while leading from the conducting element 201 is a conductor 220. These conductors lead to and terminate at switching levers 221 to 225 inclusive. A switching relay 226 simultaneously moves switching levers 221 to 225 inclusive from normal position shown in Fig. 19 to their alternate position. Switching relay 226 is also provided with armature 227 which operates to close a locking circuit through the locking winding 228 as will be hereinafter described.

The local selecting circuit is composed of a series of parallel branches 234, 235, 236, 237, 238. These branches are divided into five groups 239, 240, 241, 242, 243, and each group is provided with a terminal connector 244, 245, 246, 247, and 248, respectively. The branches 234 to 238 inclusive are divided into five other groups 257, 258, 259, 260 and 261. The contact terminal for each of the groups 257 to 261 inclusive is a movable contact or armature 249 each controlled by one of a series of group magnets 250, 251, 252, 253, 254, respectively. Each of the group magnets 250 to 254 are included in a separate branch 231, 230, 232, 229 and 233, respectively. Each of the branches 229 to 233 terminates in a fixed contact 256. Each of the terminal connectors 245 to 248 inclusive is included in a locking winding 215 of each of the receiving relays 189 to 192 inclusive, and terminates in a fixed contact 255 opposite the contact 256.

Switching levers 221 to 225 inclusive are normally in contact with the contact 256 and are moved from this position into contact with 255 upon the energization of switching relay 226. This switching relay 226 is provided with a holding coil 228 which holding coil terminates in contact 262. When the switching relay is energized it attracts its armature 227 establishing a circuit through the holding winding 228 to ground.

Controlling impulses employed in the operation of the printing apparatus are positive or negative impulses in either of the lines $L^1$ and $L^2$, followed in every case by an interval during which no current arrives over the line and a succeeding controlling impulse which may be either positive or negative current arriving over either of the main line conductors $L^1$ and $L^2$.

Let it be assumed that it is desired to print the character "F" on the record medium and let it be assumed further that the combination of impulses necessary to select and print the character "F" is a positive impulse arriving over the main line conductor $L^2$ succeeded by an interval of no current which interval is followed by a second positive impulse over the line $L^2$. A positive impulse arriving over the line $L^2$ will energize the polarized relay 191 and the neutral relay 211, the current passing through the winding 213 of this neutral relay. As a result relay 191 attracts its armature 194 and the relay 211 attracts its armature 214. A circuit is closed which may be traced from battery 195 armature 193 of the polarized relay 189, conductor 197, armature 194, contact point 199, conductor 217, switching lever 222, contact point 256, branch conductor 232, winding of the group magnet 252, conductor 263, conductor 264, locking winding 265 of the circuit holding relay 267, armature 268 of the disconnect relay 269, to ground. As a result of the closing of this circuit the group magnet 252 attracts its armature 272 and the group contact or armature 249.

The attraction of the armature 272 closes a locking circuit for the group magnet 252 which may be traced from the common battery wire 202, armature 272, winding of the group magnet 252, conductor 263, conductor 264, locking winding 265 of circuit holding relay 267, armature 268 to ground. This last circuit passing through the winding 265 of the circuit holding relay 267 acts as a locking circuit for this relay. The neutral relay 211 was also energized by current impulses over line $L^2$ and attracted its armature 214 moving the same into contact with terminal 275 of the conductor 277 thereby establishing a circuit which may be traced from battery 278, energizing winding 266 of the circuit holding relay 267, conductor 277, terminal 275, armature 214 to ground. Circuit holding relay 267 attracts both its armatures 279 and 280 into contact with 281 and 282 respectively. The attraction of the armature 279 establishes a circuit which may be traced from battery 283, armature 284, conductor 285, spacing magnet 134, conductor 286, armature 279, contact 281, conductor 287, conductor bar 151, contact 150, armature 143 of the reset magnet 142 to ground. The closure of this circuit energizes the spacing magnet 134 which attracts its armature 137 allowing the pawl 138 to move into engagement with the ratchet 129 and causing the pawl to drive the ratchet thereby revolving the shaft 128 through a portion of a revolution and moving the paper carriage 120 to the left, as viewed in Fig. 2, a sufficient distance to provide a clean surface on the paper for the character selected.

The attraction of the armature 280 establishes a circuit which may be traced from common battery wire 202, armature 280, contact 282, conductor 288, energizing winding 289 of switching relay 226, up to the contact 276. At the cessation of the first impulse the armature 214 of the neutral relay 211 is retracted closing the circuit just traced and energizing the winding 289 of the switching relay 226. All the switching levers 221 to 225 inclusive are simultaneously moved from contact 256 to the contact 255 and at the same time armature 227 is brought into contact with the terminal 262 thereby establishing a locking winding for the switching relay 226 which may be traced from common battery wire 202, armature 280 of circuit holding relay 267, terminal 282, conductor 288 to armature 227, terminal 262, winding 228 to ground. The first impulse having ceased the polarized relay 191 and the neutral relay 211 return to normal, leaving the rest of the circuits and apparatus in the following condition: Group relay 252, switching relay 226 and circuit holding relay 267 are energized and locked in the energized condition while the paper carriage 120 has been stepped forward a sufficient distance to provide a clean surface on the paper on which to print the character selected.

The second impulse of the combination of impulses is assumed to be a positive impulse arriving over main line conductor $L^2$. The interval of no current being at an end the second impulse is sent over the main line conductor $L^2$, energizing as before the polarized relay 191 and the neutral relay 211. The armatures 194 and 214 are attracted and a circuit is closed which may be traced from battery 195, armature 193, conductor 197, armature 194, contact 199, conductor 217, switch lever 222, contact 255, locking winding 215 of the polarized relay 191, conductor 248 through one of the type magnets in the group 243 through a branch conductor of one of the group of conductors 260, contact lever of armature 249, conductor 388, and in multiple, one branch through conductor 389 through the printing magnet 107, conductor 290, armature 291 of the restoring relay 292 to ground, and the other branch through the conductor 293, stop magnet 100, to ground. Closure of this circuit energizes the printing magnet 107 which attracts its armature 110, bringing the presspad 115 in position to print after the deënergization of the printing magnet. The circuit through the last branch of the multiple circuit energizes the stop magnet 100 which attracts its armature 102 moving the pawl extension 103 from engagement with the ratchet 41 fastened to the type shaft 40, which shaft immediately starts to revolve under the influence of the spring 84. The type magnet through which the current passes is also energized attracting its armature 96 into the path of the revolving arm 42 on the type shaft 40. The type shaft 40 revolves in the direction of the arrow shown in Fig. 20 and will revolve until the arm 42, contacting with the armature 96 of the energized type magnet, brings it to a stop and closes a circuit from battery 294, winding of restoring relay 292, conductor 295, conductor 296, armature 96 of the selected type magnet, radial arm 42 of the type shaft 40 to ground. Closure of this circuit energizes restoring relay 292 which attracts both its armatures 291 and 297. The attraction of the armature 291 breaks the circuit traced above through the printing magnet 107 which is thereby deënergized and spring 111 moves the armature 110 to its retracted position and the presspad 115 prints the selected character on the paper. The attraction of the armature 297 partially closes a circuit for the disconnect magnet 269 which may be traced from common battery wire 202 to armature 297, conductor 298, disconnect magnet 269, conductor 299, contact 276. This circuit is completely closed to ground through armature 214 upon the deënergization of relay 211 due to the cessation of the second impulse. The neutral relay 211 therefore acts as a guard to prevent the actuation of the disconnect relay 269 until the cessation of the second impulse.

As the locking circuit through the winding 265 of the circuit holding relay 267 acts as a locking circuit for the group magnet 252, the group magnet is deënergized and its armature 272 returns to normal position when the locking circuit is broken by the disconnect magnet 269 attracting its armature 268. The group contact or armature 249 of this group relay also returns to its normal position and the type magnet and group magnet, together with the selecting relays, are returned to normal. The circuit holding relay 267 being deënergized allows its armature 280 to break contact with 282 destroying the locking circuit which has existed for the switching relay 226, which thereby returns to its normal position. The breaking of the circuit through the selected type magnet also deënergized the stop magnet 100 and its armature 102 is returned to retracted position by spring 104, the pawl extension 103 moving into contact with the ratchet 41 on the type shaft 40. When the pawl 103 is moved into contact with the ratchet 41 it assumes first the position shown in Fig. 12, and when it is fully retracted it assumes the position shown in Fig. 14, moving, during this period, the ratchet 41 in the reverse direction sufficient to allow the radial arm 42 on the shaft 40 to break contact with the armature 96 of the selected type magnet. As the circuit through the type magnets is at this time broken, the armature 96 drops to its initial position.

The carriage is moved forward to provide a space between successive words by sending a special impulse, which is negative battery impressed simultaneously upon both main line conductors $L^1$ and $L^2$ thereby actuating the spacing magnet without at the same time selecting any of the type magnets. This impulse impressed simultaneously upon both main line conductors $L^1$ and $L^2$ energizes both polarized relays 190 and 192 and also the neutral relay 211. All three relays attract their armatures and the armatures of the polarized relays are so related that contact is made by armature extensions 209 and 210. All battery is by this means removed from the selecting circuits and the only circuit closed is the one which may be traced from battery 278, energizing winding 266 of circuit holding relay 267, conductor 277, contact 275, armature 214 of the neutral relay 211 to ground. Closure of this circuit energizes the circuit holding relay 267 which attracts its armature 279 closing the circuit through the spacing magnet 134 from battery 283, armature 284, conductor 285, spacing magnet 134, conductor 286, armature 279, contact 281, conductor 287, conducting bar 151, contact 150, armature 143 of the reset magnet 142, to ground. This circuit energizes the spacing magnet 134 which attracts its armature 135 and the pawl 138 contacting with the ratchet 129 moves the paper carriage 120 forward through the space of one character. As no holding circuit is closed by the special impulse, above described, all parts of the device return to normal position. At the initiation of the impulse also the simultaneous attraction of both of the armatures of polarized relays 190 and 192 removed the common battery wire 202 from connection with all parts of the selecting circuit, and any part of the selecting circuit that may have been locked up is thereby deënergized.

As each character is successively printed on the paper the paper carriage 120 is moved to the left, as shown in Fig. 20, until it reaches the limit of its travel. When the paper reaches such a position in its travel that there remains to be printed but six or seven characters with which to complete the line, an insulating member 300 mounted on the end of the carriage moves into contact with a plunger 301 mounted on a spring contact 302 and lying in the path of the movement of the insulating member 300. The spring contact 302 is thereby moved rearwardly into contact with a member 303 closing one point in the reset circuit. When the paper carriage reaches the extreme limit of its travel the special impulse (negative over L¹ and L² simultaneously) is transmitted from the sending station, establishing a circuit from battery 304, energizing winding 327 of the reset magnet 142, conductor 305, contact 303, contact 302, conductor 306, contact 210, contact 209, to ground.

The reset magnet 142 is energized attracting its armature 143, and the pin 149 thereon moving against the ratchet stop 147 removes the same from engagement with the ratchet wheel 129 allowing the paper carriage 120 to return to its initial position under the influence of spring 133. When the armature 143 of the reset magnet 142 reaches its attracted position the locking member 184, mounted on the angular arm 166 of the paper lift magnet, is moved to operative position by spring 185, thereby locking the armature 143 in its attracted position. When the paper carriage 120 reaches its initial position it moves spring contact 187 into engagement with spring contact 188 thereby closing the circuit for the paper lift magnet 156, which may be traced from common battery wire 202, paper lift magnet 156, conductor 307, contact 187, contact 188, conductor 308, conductor 153, contact 154, armature 143 to ground. Closure of this circuit energizes paper lift magnet 156 which attracts its armature 157 moving the paper gripping surface 183 into engagement with the pivoted abutment 182, gripping the paper therebetween and lifting the paper upward across the face of the paper carriage 120 a sufficient distance to provide a clean surface for a succeeding line of characters. At the same time the locking member 184 is moved forward out of engagement with extension 155 on armature 143, which armature is moved to its retracted position by the spring 145. The operation of the paper lift magnet closes the contacts 334 and 335, establishing the following circuit: from ground through the contacts 334 and 335, conductor 336, conductor 295, restoring relay 292, battery 294 to ground. This magnet 292 acts to restore all parts of the circuits and apparatus to normal.

If it is desired to print any of the characters shown on the lower row of type on the type wheel, a combination of impulses is transmitted from the sending station to energize the shift magnet 48, thereby moving the type wheel 45 upwardly on the type shaft 40. Let it be assumed that this combination of impulses consists of a positive impulse transmitted simultaneously over both main line conductors L¹ and L² followed by an interval of no current and then a second impulse similar in character to the first. The first impulse of this combination will energize polarized relays 189 and 191 and neutral relay 211. As a result the following circuit is closed: common battery, wire 202, armature extensions 200 and 201, conductor 220, switch lever 225, contact 256, branch conductor 233, group magnet 254, conductor 263, conductor 264, locking winding 265 of the circuit holding relay 267, armature 268 to ground. At the same time circuit is closed from battery 278 through energizing winding 266 of the circuit holding relay 267, conductor 277, contact 275, armature 214 of the neutral relay 211 to ground. Both armatures 279 and 280 of circuit holding relay 267 are attracted, the armature 279 closing the energizing circuit through the spacing magnet 134, as above described. The group relay 254 attracts its armatures 274, 309, 310 and the group contact or armature 249. The attraction of the armature 274 closes a locking circuit for the group relay 254 through the locking winding 265 of the circuit holding relay 267, as above described.

The attraction of the armature 280 establishes a circuit which may be traced from common battery wire 202 and up to and including the contact 276. At the cessation of the first impulse the polarized relays 189 and 191 and the neutral relay 211 are de-energized, their armatures returning to their normal or retracted position. Armature 214 of neutral relay 211 contacts with 276 completing the circuit through the energizing winding of switching relay 226 to ground. The switching relay 226 being energized moves all the switching levers 221 to 225 inclusive from contact with 256 and into contact with 255 and completes a locking circuit for itself from the common battery wire 202, through the armature 227, contact 262, locking winding 228 to ground. The interval of no current having taken place, at its termination the second impulse is initiated. Relays 189, 191 and 211 are again energized as before and a circuit is closed which may be traced from common battery wire 202, armature extensions 200, 201, conductor 220, switch lever 225, contact 255, conductor 311, shift relay 312, conductor 263, conductor 264, locking winding 265 of the circuit holding relay 267, armature 268 to ground. The shift relay 312 is energized attracting its armatures 313, 314 and 315 and providing itself with a holding circuit through armature 313, winding 312, conductors 263 and 264, winding 265 of relay 267, armature 268 to ground. A circuit is also closed which may be traced from common battery wire 202, armature 314, conductor 316, energizing winding 317 of the special relay 318, conductor 319, armature 310 of the group magnet 254 to ground. The special relay is thereby energized and attracts its armature 320, establishing a locking circuit for itself which may be traced from common battery wire 202, armature 297 of the restoring relay 292 and armature 322 of the disconnect relay 269, conductor 323, locking winding 321, armature 320, reset relay 324 to ground. The reset relay attracts both its armatures. The attraction of the armature 320 of the special relay 318 also completes an energizing circuit for the shift magnet 48 which may be traced from common battery wire 202 as before, armature 320, conductor 401, shift magnet 48 to ground. As this circuit passes through locking winding 321 of the special relay 318 the shift magnet 48 is locked in energized position. When the shift magnet 48 is energized it attracts its armature 49, and the roller 3 mounted at the extremity of said armature moves into contact with the lower portion of the type wheel 45 moving the type wheel upwardly and into such position with relation to the presspad that as long as the shift magnet 48 is locked in energized position only the characters on the lower row on the type wheel will be printed on the paper. The type wheel being shifted the character desired is selected and printed in a manner analogous to the character "F" hereinbefore described. As before the printing magnet 107 is deënergized and the disconnect relay 269 energized resulting in the restoration of all parts of the selecting circuit to nominal. It should be noted that in addition to all parts of the selecting circuit being restored to normal by the operation of the disconnect relay 269 and the restoring relay 292 the locking circuit through the winding 321 of the special relay 318 is broken allowing the shift magnet 48 to return to normal.

To reset the paper carriage from any point in its travel, as for the purpose of paragraphing, there is provided a separate winding 326 on the reset magnet 142, this winding being included in a circuit controlled by the reset relay 324. The reset relay 324 is operated and locked in operated position by the special relay 318, which in turn is selected and operated by two positive impulses, separated by an interval of no current, over both conductors $L^1$ and $L^2$ simultaneously in a manner analogous to that above described for the shifting operating. By this operation the circuit and apparatus are in such a condition that the impulses, normally adapted for the energization of a type magnet for which coil 326 of reset magnet 142 has been substituted, if sent over the line conductors will result in energizing said coil 326. The combination of impulses to accomplish this result is a positive impulse over line conductor $L^1$ followed by an interval of no current in either line, then by a negative impulse over line conductor $L^2$.

A positive impulse over $L^1$ energizes the polarized relay 189 and the neutral relay 211, which attract their armatures. The armature of relay 189 closes a circuit which may be traced from battery 196, armature 194 of polarized relay 191, conductor 197, armature 193, contact 198, conductor 216, switchlever 221, contact 256, conductor 231, group magnet 250, conductor 263, conductor 264, locking winding 265 of circuit holding relay 267, armature 268 to ground. Group magnet 250 attracts its armatures, establishing for itself a locking circuit from common battery wire 202, armature 270, winding of group magnet 250, conductor 263, conductor 264, locking winding 265 of circuit holding relay 267, armature 268, to ground. The armature of neutral relay 211 closes a circuit from battery 278, energizing winding 266 of circuit holding relay 267, conductor 277, contact 275, armature 214, to ground and back to battery. Circuit holding relay 267 is thus energized and attracts both its armatures 279 and 280. The attraction of the armature 279 performs no useful function as the circuit which is ordinarily completed at this point is broken at the armature 284 of the reset relay 324, which, it will be remembered, is locked in energized condition. The attraction of the armature 280 establishes a circuit for the switching relay 226 up to and including the contact 276, which circuit is closed at the cessation of the first impulse, thereby energizing the switching relay which moves all the switching levers 221 to 225 inclusive from the contacts 256 to their alternate contacts 255, and attracts its armature 227 completing a locking circuit for itself through the locking winding 228. The interval of no current over either line conductor takes place after the cessation of the first impulse, and at its termination the second impulse (negative over $L^2$) is initiated. This impulse energizes polarized relay 192 and neutral relay 211. The energization of the neutral relay 211 performs no useful function at this time. Relay 192 attracts its armature and establishes a circuit from common battery wire 202, armature 206, contact 208, conductor 219, switching lever 224, contact 255, locking winding 215 of the relay 192, conductor 329, armature 330 of the reset relay 324, conductor 331, winding 326 of the reset magnet 142, conductor 332, armature 328 of the group magnet 250, conductor 333, armature 325 of the reset relay 324 to ground. The completion of this last circuit energizes the reset magnet 142 which attracts its armature and, as hereinbefore described, the paper carriage 120 returns to its initial position under the influence of the spring 133, the armature of the reset magnet being locked in operative position until released by the operation of the paper lift magnet 156, as will be well understood.

While I have shown and described several batteries or sources of current, it is to be understood that where these batteries or sources of current are of the same character and potential and located at the same place, they may be and preferably are one and the same battery or source of current.

What I claim is:—

1. In a printing telegraph, the combination of a selecting circuit, a plurality of type magnets therein, a receiving device including a relay, for selecting any one of the type magnets, a locking circuit for holding the selecting circuit in position, and contacts in said locking circuit controlled by the relay after the cessation of its energizing current.

2. In a printing telegraph, the combination of a main line, a receiving device therein responsive to current impulses, and including a relay, a local circuit having a type magnet therein and closed by the receiving device, a locking circuit for the local circuit, and contacts in said locking circuit controlled by the relay after the cessation of an impulse from the main line whereby the local circuit may return to normal condition.

3. In a printing mechanism, the combination with a controlling circuit containing polarized relays and a neutral relay, each responsive to current impulses, of a local selecting circuit having a plurality of branches therin, a type magnet in each of said branches selectively operated by a combination of impulses in the controlling circuit, a second local circuit closed by the armature of the selected type magnet, a presspad actuating electromagnet controlled by the closure of said last named circuit to print the character selected by the type magnet, a locking circuit for the local selecting circuit, and contacts included therein controlled by said neutral relay for returning the selecting circuit to normal condition.

4. In a printing telegraph, the combination of a controlling circuit responsive to current impulses from a distant station, including a neutral relay, a selecting circuit having a series of branches, a type magnet in each of said branches each responsive to a combination of impulses received by the controlling circuit, a printing magnet in said selecting circuit and operated thereby, a locking circuit for said selecting circuit, and contacts in said locking circuit controlled by the neutral relay whereby the selecting circuit may return to normal condition only after the cessation of a combination of impulses.

5. The combination of a rotary shaft, a type wheel having two rows of type and movable longitudinally of the shaft to bring either row of type into printing position, a shifting magnet for moving said type wheel in a direction along the axis of said shaft, an energizing circuit for the shift magnet, a selecting circuit for the shift magnet including a relay, and a locking circuit for the relay included in the energizing circuit for the shift magnet whereby the shift magnet is held energized after the return of the selecting circuit to normal.

6. In a printing telegraph, the combination of a main line, a receiving device in the main line responsive to current impulses received from a distant station, a shift magnet, an energizing circuit therefor, a relay having a locking winding included therein, a rotatable type shaft, a type wheel having two rows of type thereon, rotatable with the type shaft and movable longitudinally thereof, an armature for the shift magnet contacting at its outer end with the type wheel whereby when the shift magnet is energized the type wheel is moved longitudinally of the shaft, a selecting circuit, a group magnet in said circuit, operated by a combination of impulses from a distant station, a circuit closed by the armature of said group magnet and including an energizing winding of the said relay whereby the shift magnet is energized and the type wheel moved.

7. In a printing telegraph, the combination of a main line, receiving relays therein responsive to current impulses in the main line, a laterally moving paper carrier, means for moving the paper across the face of said carrier, an electromagnet for operating said means, an energizing circuit for said electromagnet having two break points in series therein, one in the path of the paper carrier and closed thereby when the paper carrier reaches its initial position, the other controlled by a receiving relay and closed upon the energization thereof in response to an impulse from a distant station.

8. In a printing telegraph, the combination of a laterally moving paper carriage, a reset magnet therefor whereby the paper carriage may be returned to initial position from any point in its travel, an energizing circuit therefor, a paper lift magnet, and an energizing circuit therefor having two break points in series therein closed by the paper carriage when it reaches its initial position and by the armature of the reset magnet respectively whereby the paper is moved across the face of the carriage.

9. In a printing machine, the combination of a laterally moving paper carriage, an electromagnet, a circuit including said electromagnet closed by said carriage, an armature for said electromagnet, a spring-pressed plunger carried thereby, a pivoted member in the path of said plunger and against which the plunger contacts thereby gripping the paper, a bell crank lever mounted on the armature, and a mechanical connection between said plunger and said lever whereby the outer end of the plunger is moved forward and upward 10. In a printing machine, a paper carriage, a pivoted lever mounted at one side thereof, an electro-magnet mounted at the other side, an armature therefor, a bell crank lever upon which said armature is mounted, a pivoted rod mounted upon one arm of said bell crank lever, a gripping device at one end of said lever, and a spring-pressed plunger pivotally mounted at the lower end of gripping device and slidably mounted in the other arm of the bell crank lever whereby when the electromagnet is energized the gripping device is moved forwardly into contact with the pivoted lever and then upwardly.

11. In a printing machine, in combination, a laterally moving paper carriage, a spring operated shaft connected thereto, a reset magnet, an armature therefor, means controlled by said armature for controlling said shaft, a locking device for the armature of said reset magnet to hold said armature in operated position, said carriage moving laterally under the influence of said spring operated shaft, a paper lift magnet, an armature therefor, and a paper lift mechanism operated thereby, said last mentioned armature also releasing the locking device for the reset magnet whereby all parts of the device return to normal.

12. In a printing machine, the combination of selecting circuit branches, a relay in one of said branches selected and locked by selecting impulses from a transmitting station, a reset magnet coöperating with said relay and controlled by additional impulses from a transmitting station, a laterally movable paper carriage, a spacing magnet therefor, a motor for returning said carriage to normal position, and a holding mechanism under control of said reset magnet whereby said carriage may be returned to normal position at will.

13. In a printing machine, the combination of a spacing magnet, a paper carriage operated step-by-step thereby, a spring motor for returning said carriage to normal position, controlling means therefor operated by the paper carriage at the end of its stroke, and a selecting device coöperating with said controlling means whereby the carriage is returned to normal position.

14. In a printing machine, the combination with a selecting device, a laterally movable paper supporting carriage, of a driving rod for said carriage having a spring motor, an electromagnet for imparting a rotary motion to said rod whereby a step-by-step motion is imparted to said rod and the spring motor is wound up, and releasing mechanism for said spring motor controlled conjointly by the carriage at the limit of its travel and the selecting device to thereby cause the return of the carriage to normal.

15. In a printing machine, the combination with a selecting circuit, of a spacing magnet, a laterally movable paper carriage operated thereby, a motor for returning said carriage to normal position, an electromagnetic starting device for said motor having two energizing circuits, key controlled switches for controlling one of said circuits whereby the carriage may be returned to normal from any point of travel, and a switch for partially closing the other circuit at the limit of the travel of the carriage, whereby the carriage upon the limit of its travel may be returned to normal by the selecting circuit.

16. The combination in a printing telegraph of a selecting circuit having a series of branches, type magnets, one in each branch, switch magnets adapted to be locked in energized condition, a main line circuit, relays in said circuit operating contacts in said selecting circuits, and means controlled by said main line relays independently of the selecting circuit contacts to affect the battery branch of said selecting circuit.

17. In a printing telegraph, the combination of a main line, a series of polarized magnets, and a neutral relay in said line, a source of current, a plurality of type magnet selecting circuits adapted to be connected to the source of current and locked in energized condition, a laterally movable paper carriage, means to move said carriage step by step to print successive characters, a spacing magnet for operating said means and included in a circuit, a break point in said spacing magnet circuit closed by a relay in the selecting circuit, a switch closed by a group of polarized magnets whereby the source of current is disconnected from the type magnet selecting circuit and all parts thereof return to normal condition, and a second switch controlled by the neutral relay, whereby the spacing magnet is energized and the carriage is moved laterally.

18. In a printing telegraph, the combination of a main line, a series of electromagnets in said line, a source of current, a plurality of type magnet selecting circuits adapted to be connected to the source of current and locked in energized condition, switching means controlled by a group of said series of electromagnets operating simultaneously whereby the source of current is disconnected from the type magnet selecting circuit and all parts thereof return to normal condition.

19. In a printing telegraph, the combination of a main line, a series of relays in said line, a common battery wire, a plurality of selecting branch circuits intermittently connected to the common battery wire and locked in connected position, a source of current for said common battery wire normally connected thereto, switching means operated by a group of said series of relays operating simultaneously in response to an impulse received over the main line to remove said source of current from the common battery wire whereby all the selecting branch circuits are returned to normal condition.

20. In a printing telegraph, the combination of a main line, a series of polarized relays, and a neutral relay in said line, a common battery wire, a plurality of selecting branch circuits intermittently connected to the common battery wire and locked in connected position, a source of current for said common battery wire normally connected thereto, a switch controlled by a group of said series of relays in response to an impulse received over the main line to remove said source of current from the common battery wire whereby all the selecting branch circuits are restored to normal condition, a laterally movable paper carriage, means for intermittently moving said paper carriage, and electromagnet for operating said means and included in a circuit, and a switch in said circuit operated upon the energization of the neutral relay to energize the electromagnet.

21. In a printing machine, the combination of a shaft, a spring for driving said shaft, a motor for winding said spring, a switch arm extending from one end of said shaft, controlling the operation of said motor, a spring attached to the end of said arm and opposing said motor whereby the motor is intermittently operated to wind the spring for the shaft.

22. In a printing machine, the combination of a shaft, surrounded at one end by a casing, a spring for turning said shaft in one direction, one end of the spring fastened to the shaft, the other end being fastened to the casing, a driving connection at one end of the casing, a motor of constant torque attached thereto, an energizing circuit for said motor having a switch, an arm extending from the driving connection, a spring having a tension less than the torque of the motor, one end being fastened to the arm, the other end being fastened to the base of the machine, two stops between which the arm oscillates, one stop connected to ground, the other stop connected to a source of current, an electromagnet controlling said switch and having a locking circuit, an energizing circuit for said electromagnet including said source of current, said electromagnet, said spring and said extending arm, said circuit when closed by said extending arm energizing said electromagnet, closing said switch and locking said locking circuit whereby the motor is operated until the tension of the shaft driving spring overcomes the tension of the spring attached to the extending arm.

23. In a printing telegraph receiver, the combination of a plurality of members from which one is to be selected, each member selected by a combination of but two impulses, a receiver mechanism responsive to impulses from a line and including a neutral relay, a group relay for determining a group of members from which one is to be selected, and operated by the first impulse of a combination of impulses received by the receiver mechanism, a switching member controlled by the neutral relay at the cessation of the first impulse of a combination of impulses, to determine which member of the group is to be selected, the selected member being energized by the second impulse of the combination of impulses.

24. In a printing telegraph, the combination of a stop magnet, a movable character carrier operated thereby, a series of type magnets, a selecting circuit for said type magnets comprising a plurality of branches, a plurality of line relays responsive to current impulses for closing breakpoints in said selecting circuit to selectively operate said type magnets, a printing magnet and an energizing circuit therefor controlled by the armature of the selecting type magnet to print the character selected by the type magnet.

In witness whereof, I, hereunto subscribe my name this 13th day of May A. D. 1912.

FRANK R. McBERTY.

Witnesses:
F. T. WOODWARD,
A. H. ADAMS.